(12) United States Patent
Kim et al.

(10) Patent No.: US 6,224,819 B1
(45) Date of Patent: May 1, 2001

(54) FLUIDIZED BED TYPE REDUCING SYSTEM FOR REDUCING FINE IRON ORE

(75) Inventors: Yong Ha Kim; Il Ock Lee; Hang Goo Kim, all of Pohang (KR)

(73) Assignees: Pohang Iron & Steel Co., Ltd.; Research Institute of Industrial Science & Technology, both of (KR); Voest-Alpine Industrieanlagenbau GmbH (AT)

(*) Notice: Subject to any disclaimer, the term of this patent is extended or adjusted under 35 U.S.C. 154(b) by 0 days.

(21) Appl. No.: 09/125,549
(22) PCT Filed: Dec. 28, 1996
(86) PCT No.: PCT/KR96/00259
§ 371 Date: Aug. 27, 1998
§ 102(e) Date: Aug. 27, 1998
(87) PCT Pub. No.: WO98/29574
PCT Pub. Date: Jul. 9, 1998
(51) Int. Cl.$^7$ .................................................. C22B 1/10
(52) U.S. Cl. ..................................... 266/144; 266/172
(58) Field of Search ........................... 266/144, 172

(56) References Cited

U.S. PATENT DOCUMENTS

| | | | |
|---|---|---|---|
| 5,535,991 | * | 7/1996 | Kepplinger et al. ............ 266/172 |
| 5,785,733 | * | 7/1998 | Lee et al. ...................... 266/172 |
| 5,882,579 | * | 3/1999 | Viramontes-Brown et al. .... 266/144 |
| 5,897,829 | * | 4/1999 | Kim et al. ..................... 266/172 |

FOREIGN PATENT DOCUMENTS

| | | |
|---|---|---|
| 0022098 | 1/1981 | (EP) . |
| 6-10021 | 1/1994 | (JP) . |
| WO8603986 | 7/1986 | (WO) . |

* cited by examiner

Primary Examiner—Scott Kastler
(74) Attorney, Agent, or Firm—Webb Ziesenheim Logsdon Orkin & Hanson, P.C.

(57) ABSTRACT

A fluidized bed reducing system for reducing a fine iron ore is disclosed, in which the structure of the fluidized bed reducing furnace is improved such that the coarse iron ore particles are distributed in the lower portion of the fluidized bed within the furnace and the fine iron ore particles are distributed in the upper portion of the fluidized bed. Thus, the average residence times of the particles in the furnace are adjusted differently for different ore sizes, so that the reducing efficiency can be improved, and that the residence time of the reducing gas in the furnace can be extended, thereby improving the degree of gas utilization. The fluidized bed reducing system for reducing a fine iron ore includes: an upper iron ore outlet for discharging fine iron ore particles; a lower iron ore outlet for discharging coarse iron ore particles; a gas distributor installed in a lower portion of a reducing furnace; a gas inlet formed on a lower portion of the reducing furnace for introducing a reducing gas; an iron ore inlet for supplying an iron ore of wide particle size distribution; a circulating duct connected to an upper portion of the reducing furnace for discharging extremely fine iron ore particles together with the reducing gas; a particle capturing device an extremely fine iron ore recycling duct. The fluidized bed reducing furnace includes a cylindrical upper portion and a tapered lower portion, the tapered portion being in a wide-upper-narrow-lower shape.

3 Claims, 4 Drawing Sheets

FLUIDIZED BED TYPE REDUCING SYSTEM FOR REDUCING FINE IRON ORE

FIELD OF THE INVENTION

The present invention relates to a fluidized bed type reducing system for reducing a fine iron ore. More specifically, the present invention relates to a fluidized bed reducing system for a fine iron ore, in which the structure of the fluidized bed reducing furnace is improved such that a fine iron ore having a wide particle size distribution can be made to undergo a fluidized bed reduction in an optimum manner.

DESCRIPTION OF THE PRIOR ART

A fluidized bed type reducing system for reducing a fine iron ore is disclosed in Japanese Patent Laid-open No. Hei-6-10021.

As shown in FIG. 1, this fluidized bed reducing system 10 is characterized in that a reducing gas is supplied through a lower portion of a cylindrical reducing furnace 11 so as to fluidize a fine iron ore supplied through an iron ore supplying inlet 112. Further, the fine iron ore which is discharged while being carried by the reducing gas from an upper portion of the reducing furnace through a circulating duct 115 is separated from the reducing gas by a particle capturing device 12 so as to refeed it through an extremely fine iron ore supplying duct 121 into the reducing furnace 11. The upper diameter of the reducing furnace is made larger than its lower diameter so that the elutriation of the fine iron ore can be reduced. Further, iron ore outlets 113 and 114 are formed on the upper and lower portions, respectively of the reducing furnace 11. The upper iron ore outlet 113 is for discharging fine iron ore particles whereas the lower iron ore outlet 114 is for discharging coarse particles, so that the average residence time of the iron ore in the reducing furnace can be controlled for each particle size, and thus both the fine iron ore and the coarse iron ore can be simultaneously reduced with a high efficiency.

However, the iron ore has a wide particle size distribution, ranging from several scores of microns to several thousand microns. In the conventional fluidized bed type reducing system, if this iron ore is to be maintained in a fluidized state in an efficient manner, the operation should be carried out based on a superficial gas velocity of the coarse iron ore which is, otherwise distributed mostly in the lower level. In this high-gas-velocity operation with a conventional fluidized bed (cylindrical bed) in which the gas velocity is constant along the height of the bed, the coarse particles move upwardly to the upper level to be mixed with the fine iron ore particles, and therefore, these coarse iron ore particles which need more reducing time than the fines are discharged through the upper iron ore outlet without being sufficiently reduced. This insufficient reduction of coarse iron ore particles is encountered in the problem encountered in the conventional technique.

SUMMARY OF THE INVENTION

The present invention provides a fluidized bed reducing system for reducing a fine iron ore, in which the structure of the fluidized bed reducing furnace is improved such that the coarse iron ore particles are distributed in the lower portion of the fluidized bed within the furnace, whereas the fine iron ore particles are in the upper portion of the fluidized bed, so that the reducing can be done in a stable fluidized state hence, only the coarse iron ore particles are discharged through the lower iron ore outlet, and only the fine iron ore particles are discharged through the upper iron ore outlet. Thus, the average residence times of the particles in the furnace are adjusted differently for different sizes, so that the reducing efficiency can be improved, and the residence time of the reducing gas in-the furnace can be extended, thereby improving the degree of gas utilization.

The fluidized bed reducing system for reducing a fine iron ore of wide particle size distribution according to the present invention includes: an upper iron ore outlet for discharging fine iron ore particles; a lower iron ore outlet for discharging coarse iron ore particles; a gas distributor installed in a lower portion of a reducing furnace; a gas inlet formed on a lower portion of the reducing furnace for introducing a reducing gas; an iron ore inlet for supplying a fine iron ore of wide particle size distribution; a circulating duct connected to an upper portion of the fluidized bed reducing furnace for discharging extremely fine iron ore particles together with the reducing gas; a particle capturing device for separating the extremely fine iron ore particles from the reducing gas; an extremely fine iron ore recycling duct for refeeding the separated, extremely fine iron ore particles into the fluidized bed reducing furnace so as to reduce the elutriation of a fine iron ore of a wide particle size distribution.

The fluidized bed reducing furnace or the invention includes: a cylindrical upper portion and a tapered lower portion, the tapered portion being in a wide-upper-narrow-lower shape; and the tapered portion includes: the upper iron ore outlet, the iron ore inlet and the lower iron ore outlet on a side thereof in the mentioned sequence, and the extremely fine iron ore recycling duct installed on another side of the tapered portion.

BRIEF DESCRIPTION OF THE DRAWINGS

The above object and other advantages of the present invention will become more apparent by describing in detail the preferred embodiment of the present invention with reference to the attached drawings in which.

DETAILED DESCRIPTION OF THE PREFERRED EMBODIMENT

Figure 1:
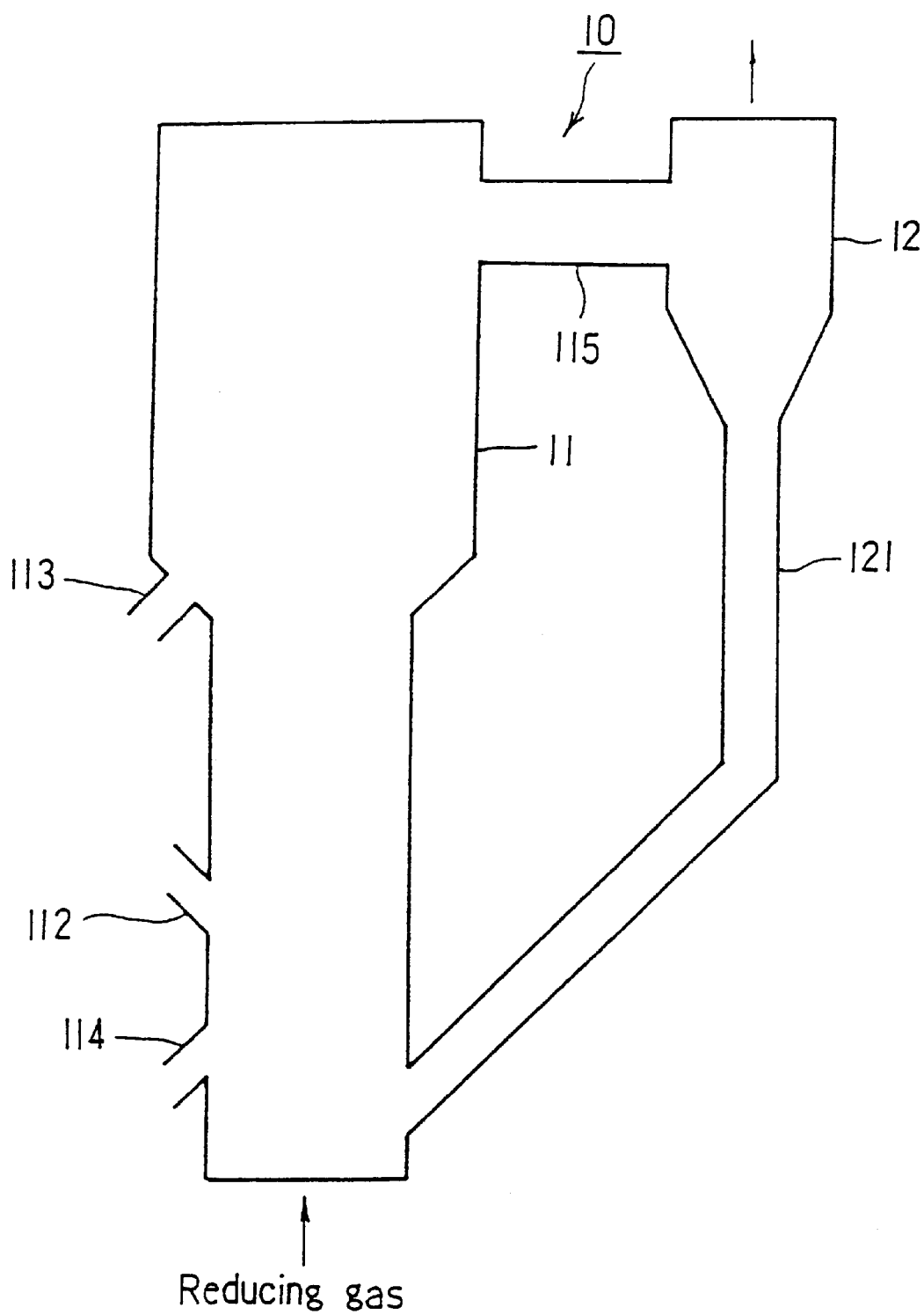
FIG. 1 is a schematic diagram showing the conventional fluidized bed reducing system.
Figure 2:
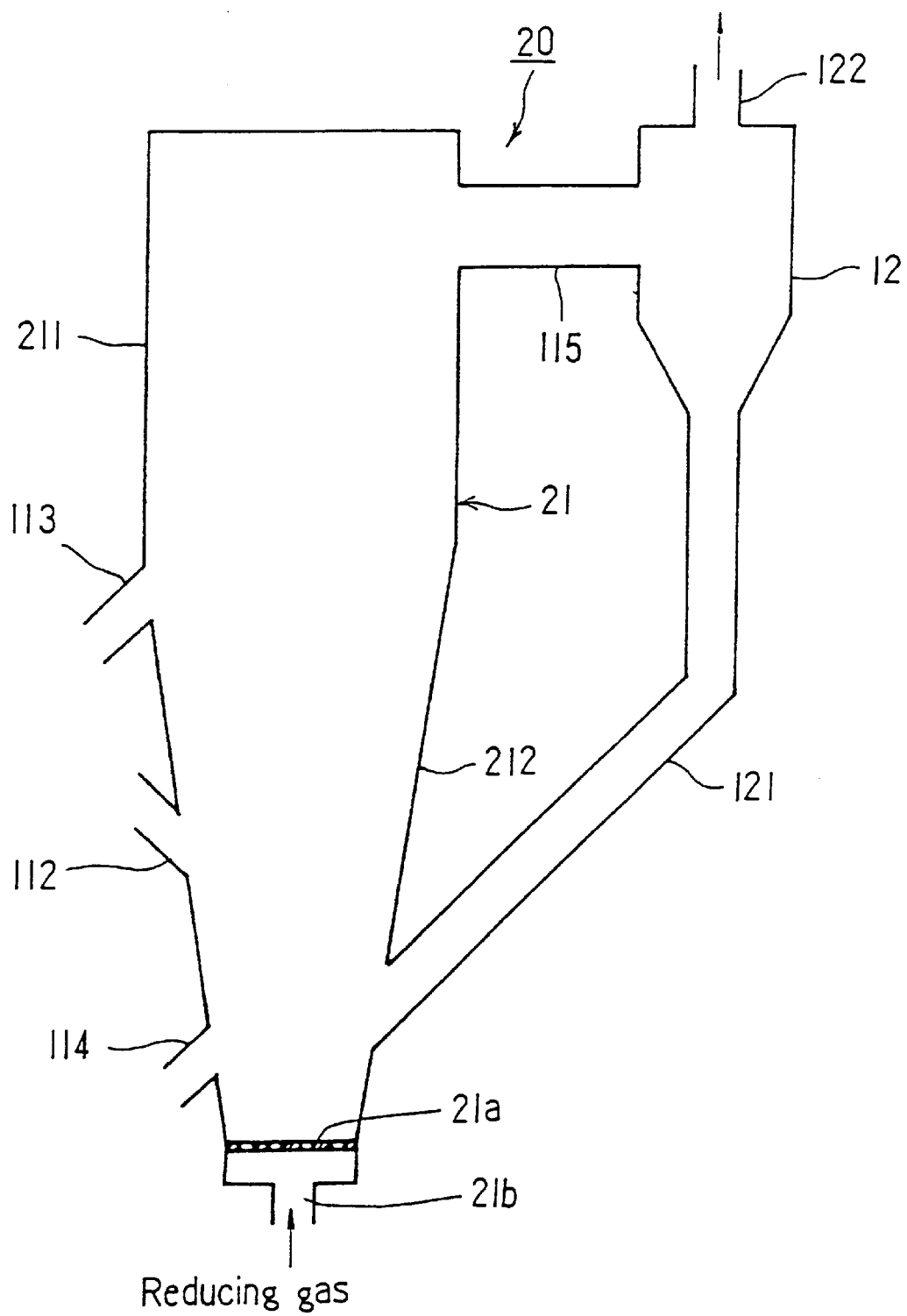
FIG. 2 is a schematic diagram showing the fluidized bed reducing system for reducing a fine iron ore according to the present invention.

As shown in FIG. 2, a fluidized bed reducing system 20 for reducing a fine iron ore according to the present invention includes: a fluidized bed reducing furnace 21 for reducing a fine iron ore of a wide particle size distribution, and a particle capturing device 12 for separating extremely fine iron ore particles from a reducing gas so as to recycle them into the fluidized bed reducing furnace 21.

The fluidized bed reducing furnace 21 includes: a cylindrical upper portion 211 and a tapered lower portion 212. The tapered portion 212 is shaped such that its upper portion is wide and its lower portion is narrow.

The inclination angle of the tapered portion 212 should be preferably 3–25°, and more preferably 5–10°.

The upper portion of the cylindrical portion 211 is connected with the particle capturing device 12 through a circulating duct 115. The fine iron ore particles which are entrained in the reducing gas are discharged through the duct 115.

The tapered portion 212 includes: an upper iron ore outlet 113, an iron ore inlet 112 and a lower iron ore outlet 114 on a side thereof in the mentioned sequence.

The upper iron ore outlet 113 and the lower iron ore outlet 114 discharge reduced fine iron ore and coarse iron ore respectively. The iron ore inlet 112 is connected to an iron ore source (not shown in the drawings).

The upper iron ore outlet 113 is formed preferably on the widest level of the tapered portion, while the lower iron ore outlet 114 is formed preferably just above a gas distributor 21a.

The lower portion of the other side of the tapered portion 212 is connected to the particle capturing device 12 through an extremely fine iron ore recycling duct 121. The extremely fine iron ore particles which are captured by the particle capturing device 12 are recycled through the extremely fine iron ore supplying duct 121 into the fluidized bed reducing furnace 21.

The gas distributor 21a is installed in the lower part of the tapered portion 212, and a reducing gas inlet 21b is formed on the bottom of the tapered portion 212.

An exhaust gas outlet 122 is formed on the top of the particle capturing device 12.

The method for reducing a fine iron ore by using the above described fine iron ore reducing system of the present invention will now be described.

The reducing gas is introduced into the fluidized bed reducing furnace 21 through the gas inlet 21b of the bottom of the fluidized bed reducing furnace 21 via the gas distributor 21a. The fine iron ore is supplied through the iron ore inlet 112, and is fluidized by the upwardly flowing reducing gas. The extremely fine iron ore particles which are discharged with the exhaust gas are captured by the particle capturing device 12 and recycled through the extremely fine iron ore supplying duct 121 and returned to the fluidized bed reducing furnace 21.

The fine iron ore which has been reduced in the fluidized bed reducing furnace 21 is discharged through the upper iron ore outlet 113, while the coarse iron ore is discharged through the lower iron ore outlet 114. Meanwhile the exhaust gas is discharged through the gas outlet 122 which is formed in the top of the particle capturing device 12.

In the present invention, the lower portion of the fluidized bed reducing furnace is in a tapered, narrow-lower shape. Therefore, the average residence time of the fine iron ore particles and the coarse iron ore particles are naturally adjusted for the different particle sizes. As the result, the reducing efficiency is improved and the residence time of the gas in the fluidizing bed is extended, thereby improving the degree of gas utilization.

The present invention will be understood more readily with reference to the following example.

EXAMPLE

The dimensions of a fluidized bed reducing furnace as depicted in FIG. 2 are listed in Table 1 below. A fine iron ore having the particle size distrubution and chemical composition as listed in Table 2 was reduced under the operating conditions as listed in Tables 2 to 4. After the reduction, the particle size segregation and the degree of reduction for different particle sizes (of the reduced iron discharged through the upper iron ore outlet 113 and the lower iron ore outlet 114) were evaluated, and the results are graphically shown in FIG. 3.

Further, for the sake of comparison, a reduction of fine ore was also carried out in a conventional fluidized bed reducing furnace. The experimental results of this case are graphically shown in FIG. 4.

TABLE 1

| | |
|---|---|
| Inner dia of lower end of tapered portion of furnace | 0.3 m |
| Height of tapered portion of furnace | 1.9 m |
| Inner dia of top of tapered portion of furnace | 0.7 m |
| Height of upper portion of reducing furnace | 2.0 m |
| Inclination angle of tapered portion of furnace | 6° |

TABLE 2

| | |
|---|---|
| Chemical composition of raw iron ore | T.Fe: 62.36%, $SiO_2$: 5.65%, $Al_2O_3$:2.91%, S:0.007%, P:0.065% |
| Particle size distribution | −0.25 mm = 22%, 0.25–1.0 mm = 28%, 1.0–5.0 mm = 50% |
| Feeding rate | 20 kg/min |

TABLE 3

(Carrying gas)

| | |
|---|---|
| Composition | CO: 65%, $H_2$: 25%, $CO_2$ + $H_2O$: 10% |
| Temperature | About 850° C. |
| Pressure | 3.3 Kgf/cm$^2$ |

TABLE 4

(Superficial gas velocity in reducing furnace)

| | |
|---|---|
| Superficial gas velocity in lower part of tapered portion of furnace | 1/5 m/s |
| Superficial gas velocity in upper part of tapered portion of furnace | 0.27 m/s |

Figure 3:
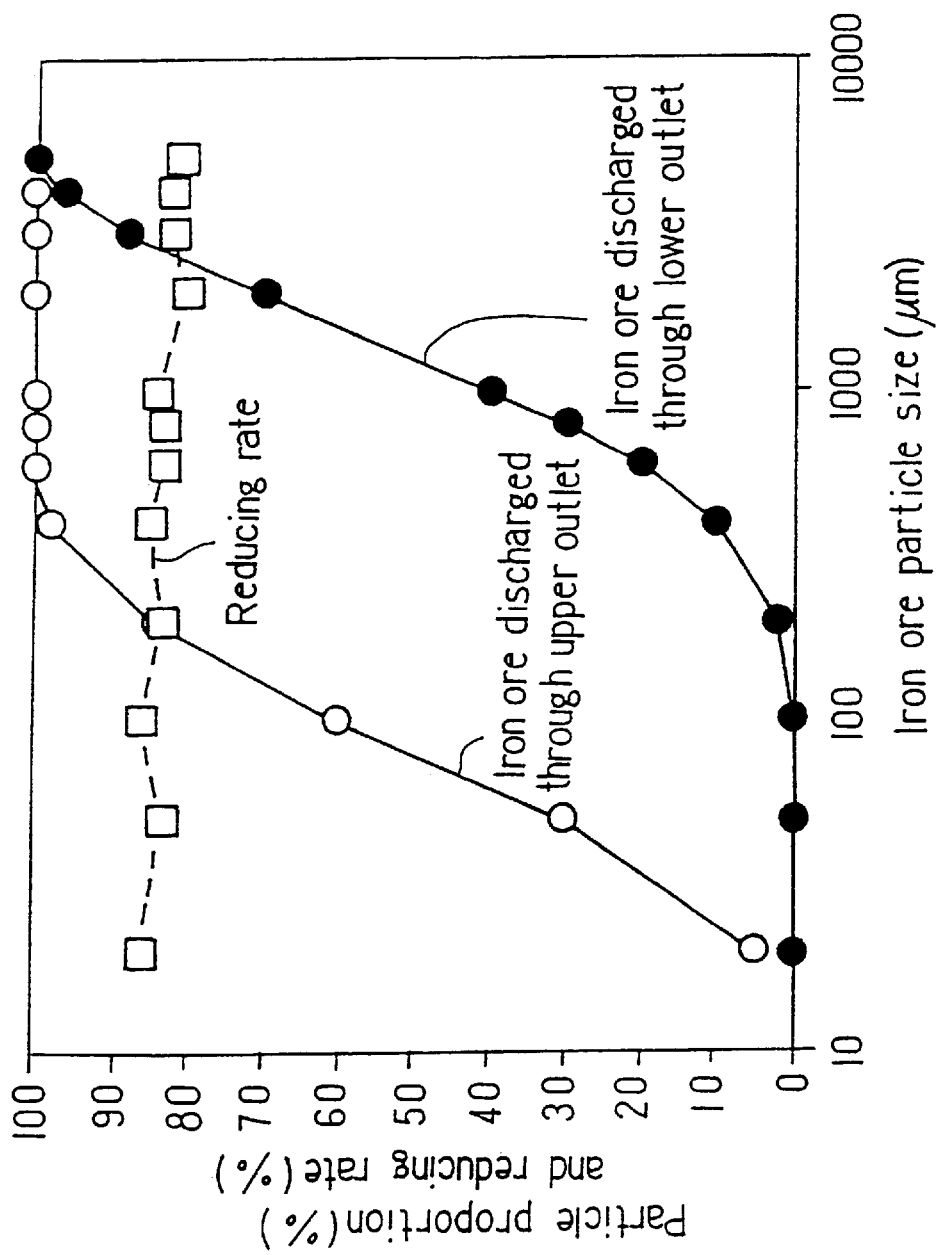
FIG. 3 is a graphical illustration showing the particle segregation and the reduction degree of iron ore for the case when fine iron ore is reduced using the present invention.
Figure 4:
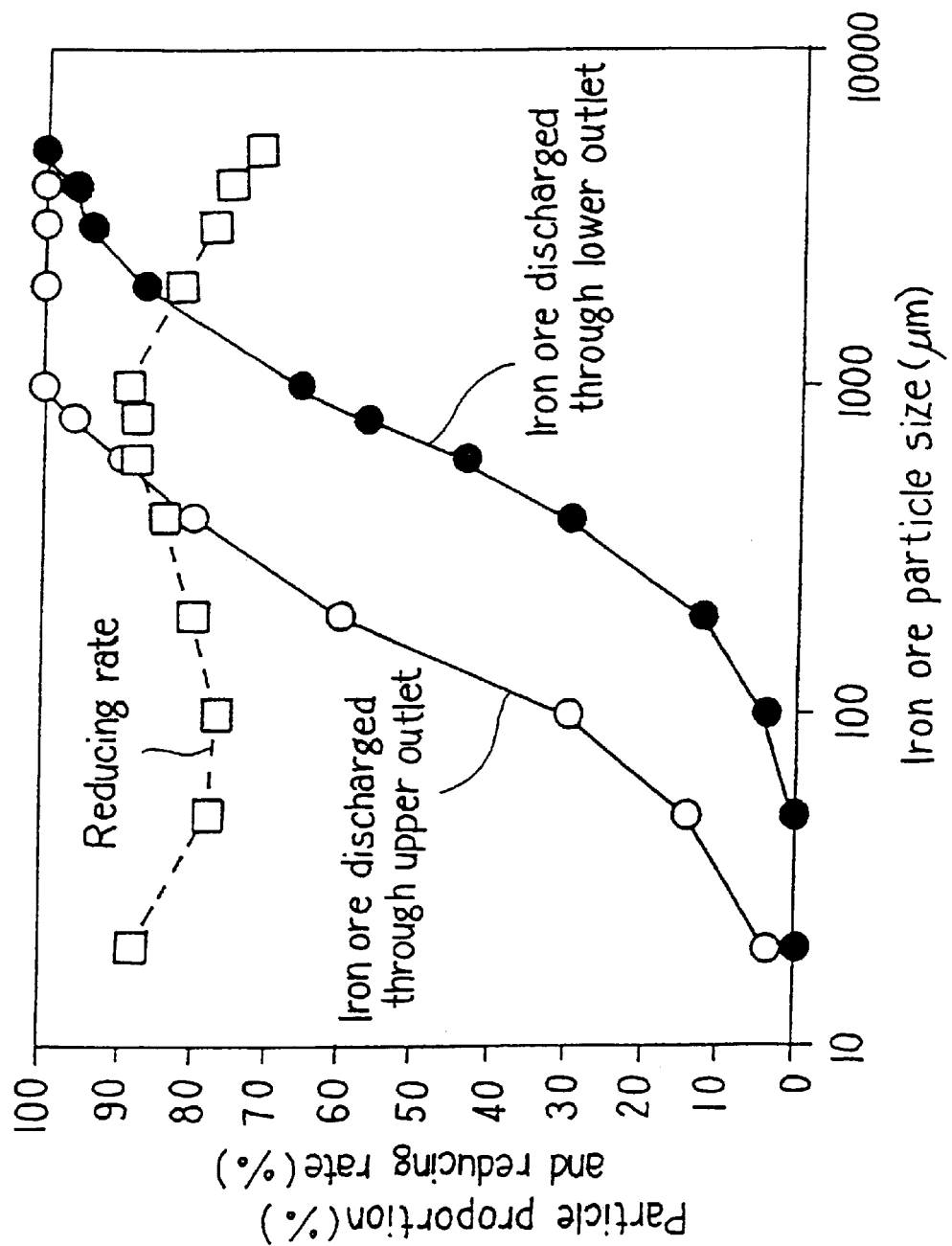
FIG. 4 is a graphical illustration showing the particle segregation and the reduction degree of iron ore for the case when fine iron ore is reduced using a conventional fluidized bed reducing system.

As shown in FIGS. 3 and 4, compared with the conventional method, the result from the present invention showed that the degree of reduction was uniform independent of particle size, and that the average degree of reduction was higher than that obtained from the conventional fluidized bed reducing furnace.

Further, a much better segregation between the reduced iron particles of 250 μm or less (which are injected into a melter by means of an pneumatic injector) and the reduced iron particles of 250 μm or more (which are fed into the melter by gravity) was observed when the present invention was employed.

What is claimed is:

1. A fluidized bed reducing system for reducing a fine iron ore comprising:
    a single fluidized bed reducing furnace having a cylindrical upper portion and a tapered lower portion, said tapered lower portion being in a wide-upper-narrow-lower shape;
    an upper iron ore outlet located at an upper region of the taper portion of the fluidized bed reducing furnace for discharging reduced fine iron ore;

an iron ore inlet located along said tapered portion of the fluidized bed reducing furnace and positioned below said upper iron ore outlet for introducing iron ore of a wide particle size distribution into said fluidized bed reducing furnace;

a lower iron ore outlet located along said tapered portion of the fluidized bed reducing furnace and positioned below said iron ore inlet for discharging coarse reduced iron ore particles;

a gas distributor means positioned at a location below said lower iron ore outlet in the lower tapered portion of the fluidized bed reducing furnace for the introduction of a reducing gas therethrough to flow upwardly through the fluidized bed reducing furnace;

a circulating duct for removing the reducing gas and entrained very fine iron ore particles from the fluidized bed reducing furnace, communicating at a first end with the cylindrical upper portion of the fluidized bed reducing furnace and at a second end to a particle capturing device for separating the extremely fine iron ore particles from the reducing gas; and a recycling duct communicating at one end with the particle capturing device and at another end to the tapered lower portion positioned on another side of the fluidized bed reducing furnace from the lower iron ore outlet for refeeding the separated, extremely fine iron ore particles into said fluidized bed reducing furnace so as to reduce the elutriation of the fine iron ore of a wide particle size distribution.

2. The fluidized bed reducing system as claimed in claim 1, wherein said tapered portion has an inclination angle of 3°–25°.

3. The fluidized bed reducing system as claimed in claim 1, wherein said tapered portion has an inclination angle of 5°–10°.

* * * * *

UNITED STATES PATENT AND TRADEMARK OFFICE
CERTIFICATE OF CORRECTION

PATENT NO. : 6,224,819 B1
DATED : May 1, 2001
INVENTOR(S) : Yong Ha Kim et al.

It is certified that error appears in the above-identified patent and that said Letters Patent is hereby corrected as shown below:

Title page,
Item [57], ABSTRACT,
Lines 22-23, "capturing device an extremely fine iron ore recycling duct. The fluidized" should read:
-- capturing device for separating the extremely fine iron ore particles from the reducing gas; an extremely fine iron ore recycling duct for refeeding the separated extremely fine iron ore particles into the fluidized bed reducing furnace so as to reduce a fine iron ore of a wide particle size distribution. The fluidized --.

Last line, after "shape." insert:
-- The tapered portion includes: the upper iron ore outlet, the iron ore inlet and the lower iron ore outlet on a side thereof in the mentioned sequence, and the extremely fine iron ore supplying tube installed on another side of the tapered portion. --

Column 1,
Line 55, after "iron ore particles is" delete "encountered in".

Column 2,
Line 6, "in-the" should read -- in the --.

Column 4,
Line 53, "250 µn" should read -- 250 µm --.

Signed and Sealed this

Eleventh Day of December, 2001

Attest:

NICHOLAS P. GODICI
*Attesting Officer*    *Acting Director of the United States Patent and Trademark Office*